United States Patent [19]
Tracy

[11] Patent Number: 5,946,164
[45] Date of Patent: Aug. 31, 1999

[54] DISK DRIVE ACTUATOR ASSEMBLY HAVING A SPRING LOCK MOUNT

[75] Inventor: Joseph Tracy, South Haven, Minn.

[73] Assignee: Hutchinson Technology, Inc., Hutchinson, Minn.

[21] Appl. No.: 08/926,575

[22] Filed: Sep. 4, 1997

Related U.S. Application Data

[60] Provisional application No. 60/024,604, Sep. 5, 1996, abandoned.

[51] Int. Cl.$^6$ ..................................................... G11B 5/50
[52] U.S. Cl. ............................................................ 360/104
[58] Field of Search .................................... 360/106, 104

[56] References Cited

U.S. PATENT DOCUMENTS

| | | | |
|---|---|---|---|
| 4,796,122 | 1/1989 | Levy et al. | 360/104 |
| 4,943,875 | 7/1990 | Reidenbach et al. | 360/104 |
| 4,947,275 | 8/1990 | Hinlein | 360/104 |
| 4,991,045 | 2/1991 | Oberg | 360/104 |
| 5,185,683 | 2/1993 | Oberg et al. | 360/104 |
| 5,198,945 | 3/1993 | Blaeser et al. | 360/104 |
| 5,296,984 | 3/1994 | Fick | 360/104 |
| 5,313,355 | 5/1994 | Hagen | 360/104 |
| 5,323,284 | 6/1994 | Pecha et al. | 360/104 |
| 5,355,267 | 10/1994 | Aoyagi et al. | 360/104 |
| 5,390,060 | 2/1995 | Pecha et al. | 360/105 |
| 5,428,489 | 6/1995 | Takamure et al. | 360/104 |
| 5,461,525 | 10/1995 | Christianson et al. | 360/104 |
| 5,495,375 | 2/1996 | Baasch et al. | 360/104 |
| 5,497,282 | 3/1996 | Hoffmann et al. | 360/104 |
| 5,579,190 | 11/1996 | Mastache et al. | 360/104 |
| 5,631,789 | 5/1997 | Dion et al. | 360/106 |
| 5,657,531 | 8/1997 | Sato et al. | 360/104 |

FOREIGN PATENT DOCUMENTS

| | | | |
|---|---|---|---|
| 5-307842 | 11/1993 | Japan | 360/104 |
| 8-195040 | 7/1996 | Japan . | |
| 9-115236 | 5/1997 | Japan . | |
| 9-115253 | 5/1997 | Japan . | |

*Primary Examiner*—Craig A. Renner
*Attorney, Agent, or Firm*—Faegre & Benson LLP

[57] ABSTRACT

An actuator assembly has a plurality of head suspensions removably secured to a plurality of arm regions of the actuator assembly. Each arm region of the actuator assembly includes a spring mount which can be compressed or expanded from a neutral state to a stressed state to engage an engagement structure on the head suspension for removably securing the head suspension to the arm region. In one embodiment, the spring mount is comprised of a pair of spring arms having holes formed in the spring mount that engage a plurality of vertical pins formed in a mounting region of the head suspension. The spring arms are urged from the neutral state, the pins are inserted through the holes in the spring arms, and the spring arms are released to engage the pins, and thereby hold the suspension in place. In a second embodiment, the spring mount includes a boss mount having a pair of members extending in a transverse direction from the spring arms. The transverse members of the boss mount each include a concave surface that engages a boss extending from the mounting region of the head suspension upon the compression or expansion of the boss mount from the neutral state to the stressed state. Upon release of the boss mount, the concave surfaces of the boss mount engage the boss, thus providing an engagement force that securely holds the head suspension in place in the actuator assembly.

10 Claims, 6 Drawing Sheets

DISK DRIVE ACTUATOR ASSEMBLY HAVING A SPRING LOCK MOUNT

This application claims the benefit of U.S. Provisional Application No. 60/024,604 filed Sep. 5, 1996.

TECHNICAL FIELD

The present invention relates generally to an actuator assembly in an information storage device. In particular, the invention is an actuator assembly having a spring mount for securing a suspension to the actuator assembly.

BACKGROUND OF THE INVENTION

Information storage devices are in wide spread use, and are used to store and retrieve large amounts of data. Such information storage devices generally include a rigid media for storing information, a read/write device for creating and accessing the information, and an actuator assembly for positioning the read/write device over the rigid media. One common example of such an information storage device is a hard disk drive having one or more rotating magnetic disks, over each of which a head suspension and a head slider are positioned. Each of the head suspensions are attached to the actuator assembly of the disk drive, which positions the suspensions and sliders at a desired location over the rotating disks.

An actuator assembly in a hard disk drive includes an actuator block, one or more arms extending from the actuator block, and the plurality of head suspensions discussed above, each of which is mounted to one of the arms of the actuator block. The number of arms and head suspensions in the actuator assembly is usually dependent on the number of disks in the disk drive, with a head suspension usually positioned on each side of the individual disks. Each head suspension is typically mounted to an arm of the actuator block by swaging or ball staking a vertical swage boss extending from a base plate on an end of the head suspension to the arm. In this method, the swage boss is inserted in a hole in the arm. The swage boss of the suspension is then deformed and engaged with the arm by forcing a round ball through the boss.

An alternative method for mounting a head suspension to an actuator arm is shown in the Reidenbach et al. reference, U.S. Pat. No. 4,943,875. In this reference, two flexible end portions of an actuator arm are inwardly flexed and positioned within a tube attached to a pair of blades. The flexible portions are released to engage the sides of the end portions with the inner side surfaces of the tube to secure the blades to the actuator arm. Other methods for securing blades to the actuator arm shown in the Reidenbach et al. reference include the insertion of adhesive strips in the tube, or the use of a compressible elastomeric locking member in the tube.

The head suspension mounting methods described above, however, have certain disadvantages. With respect to suspensions swaged to the actuator, increased spacing between the suspensions is typically required to accommodate the height of the vertical swage boss. In addition, a large vertical force must be used to swage the boss to the actuator arm, which can warp or otherwise permanently deform the actuator assembly. Suspensions that are swaged to the actuator block also cannot be selectively reworked or replaced because the swaging process cannot be reversed. With respect to alternative methods for attaching head suspensions, such as those shown in the Reidenbach et al. reference, these methods are often complex, and may not provide sufficient mechanical retention to correctly hold the head suspension in place as the actuator assembly quickly positions the head suspension. There is therefore a continuing need for an actuator assembly having an improved head suspension mount. Such an improved assembly should securely hold head suspensions in place as the actuator rotates, and should permit the selective rework or replacement of head suspensions. The improved assembly should also not require large vertical forces to attach suspensions to the actuator, and should be efficient to manufacture. An actuator assembly having reduced spacing between individual head suspensions would also be highly desirable.

SUMMARY OF THE INVENTION

The present invention is an actuator assembly for supporting a read/write device in an information storage device. The actuator assembly includes an actuator having an arm region extending from the actuator and a suspension having a mounting region. The actuator assembly further includes a spring mount in one of the arm region of the actuator and the mounting region of the suspension, and an engagement structure on a surface of the other of the arm region and the mounting region. The spring mount is elastically deformable from a neutral state to a stressed state for engaging the engagement structure to secure the suspension to the actuator.

In one embodiment, the spring mount is in the arm region of the actuator and the engagement structure is on a top surface of the mounting region of the suspension. The spring mount includes first and second spring arms that have a free end and a longitudinal slot formed therebetween. The engagement structure comprises a plurality of pins extending from the top surface of the mounting region of the suspension, and the spring arms include a plurality of holes formed in the free end of the arms, each hole having a perimeter edge that engages one of the plurality of pins in the mounting region for removably securing the suspension to the actuator.

In a second embodiment of the present invention, the spring mount further includes a boss mount extending into the longitudinal slot having two opposing concave surfaces. The engagement structure includes a boss extending from the top surface of the mounting region of the head suspension, and the boss is engaged by the opposing concave surfaces of the boss mount for removably securing the suspension to the actuator.

DETAILED DESCRIPTION OF THE PREFERRED EMBODIMENTS

Figure 1:
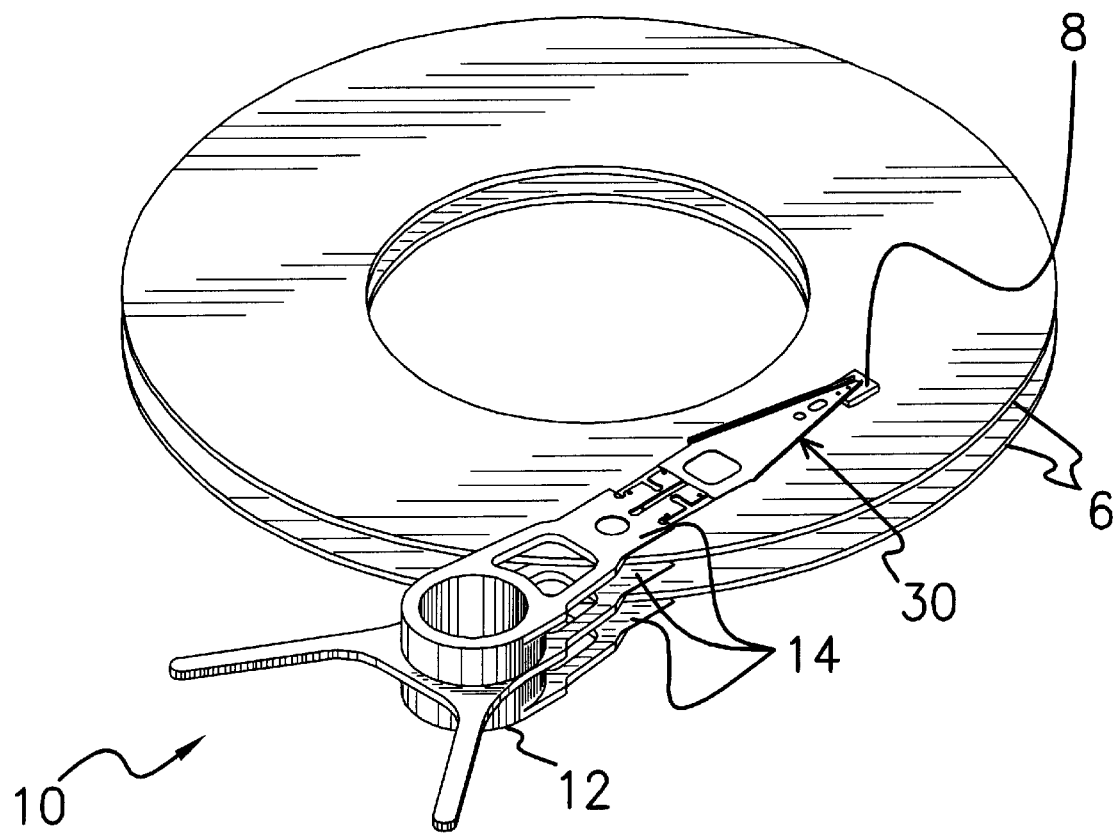
FIG. 1 is an isometric view of an actuator assembly and magnetic disk subassembly from a hard disk drive having an actuator assembly in accordance with the present invention.

FIG. 1 shows an actuator assembly in accordance with the present invention in combination with a pair of magnetic disks from a hard disk drive. Specifically, FIG. 1 shows an actuator assembly 10 used to position a plurality of head sliders 8, only one of which can be seen in FIG. 1, over a surface of the magnetic disks 6. The head sliders 8 read data from and write data to the magnetic disks 6 in a known or conventional manner.

Figure 2:
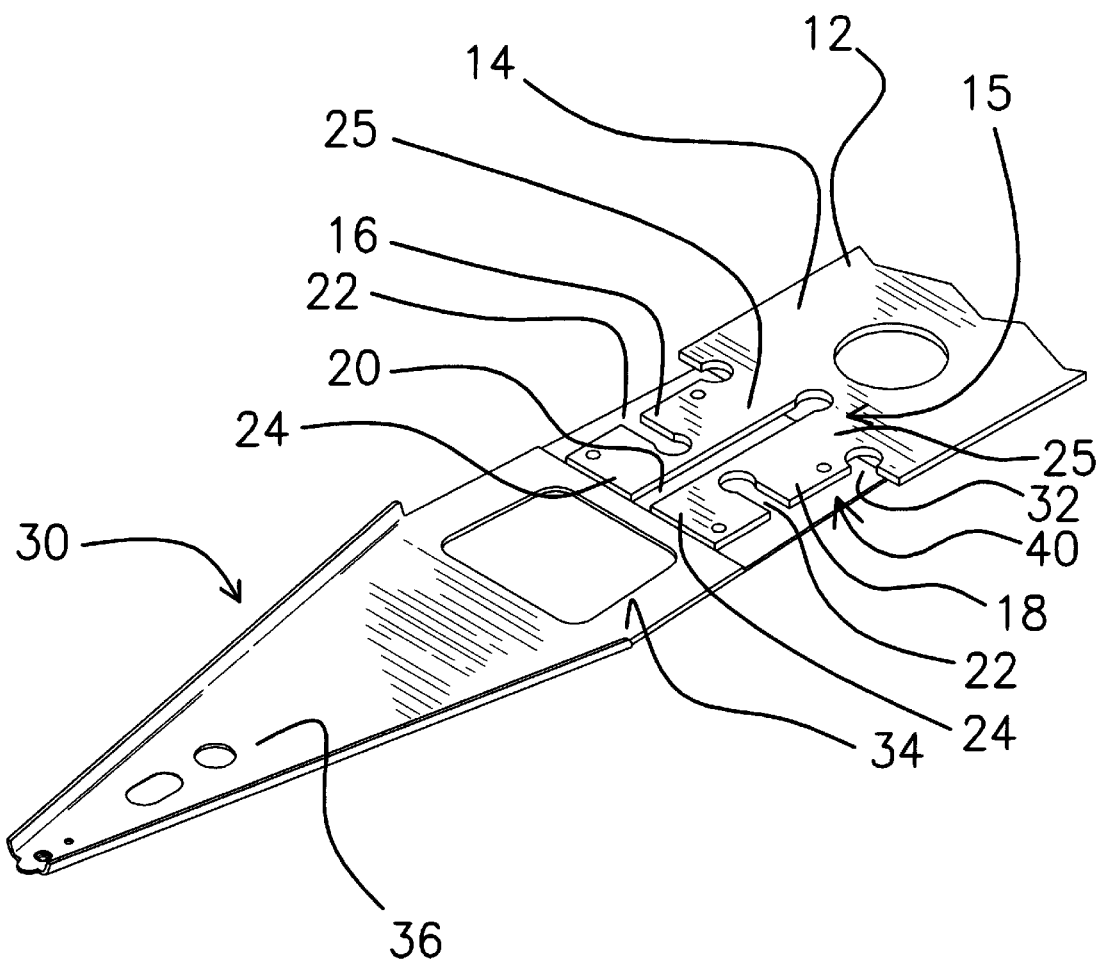
FIG. 2 is a detailed isometric view of a portion of the actuator assembly shown in FIG. 1.
Figure 3:
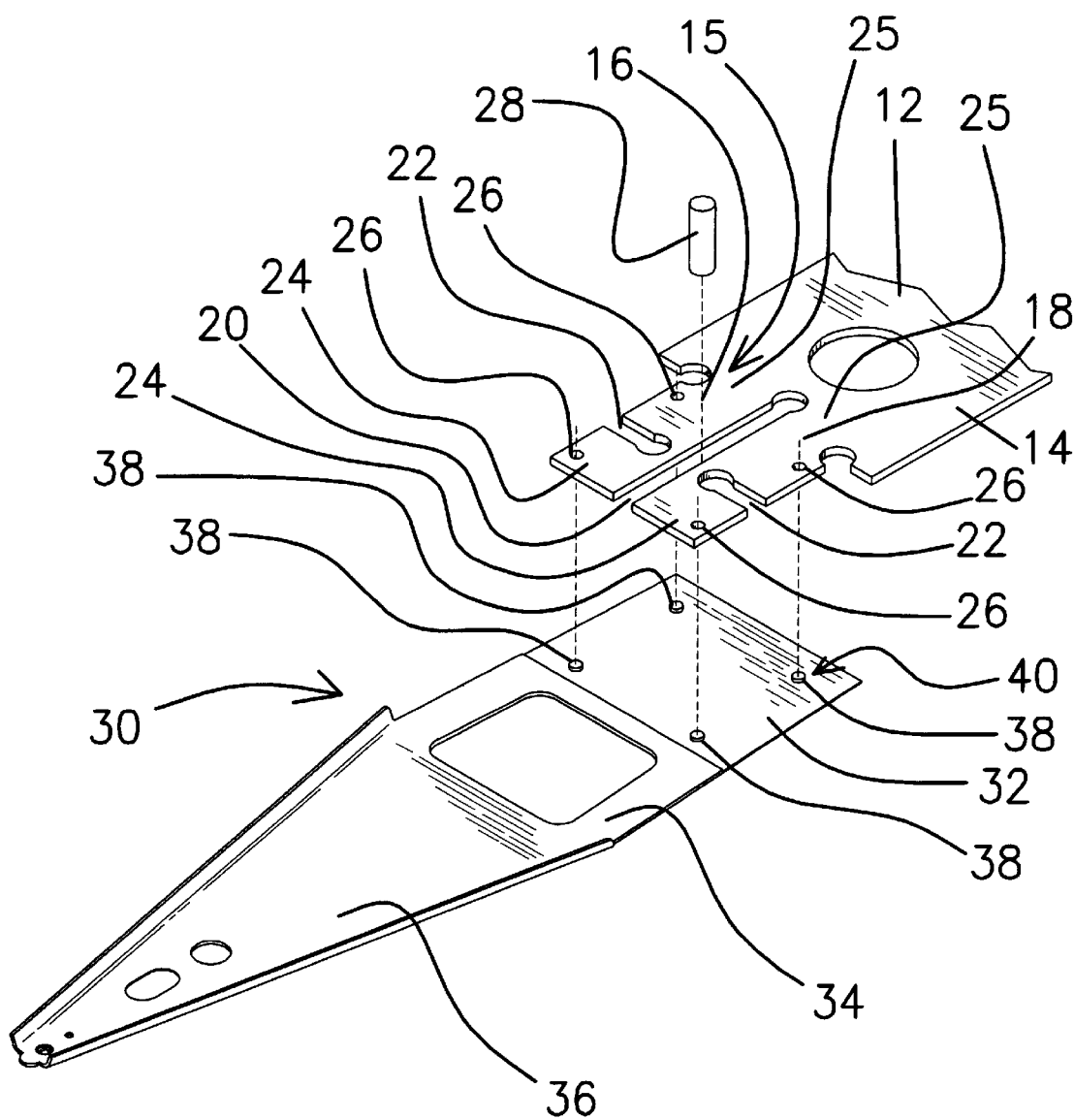
FIG. 3 is an exploded isometric view of the actuator assembly shown in FIG. 2.

As is further shown in FIG. 1, and as perhaps best shown in FIGS. 2 and 3, actuator assembly 10 is comprised of an actuator 12 having a plurality of arm regions 14 extending from actuator 12, and a plurality of head suspensions 30. In this first embodiment, arm regions 14 are integral with and extend from actuator 12. Arm regions 14 can alternatively comprise separately formed actuator arms that are mounted to actuator 12 using spot welding or similar techniques. Actuator 12 is formed using conventional techniques, such as casting, machining, or extruding the actuator from stainless steel. The number of arm regions 14 extending from actuator 12 in this embodiment is shown to generally correspond to the number of head suspensions 30 included in actuator assembly 10, with each head suspension 30 attached to an individual arm region 14 extending from actuator 12. Alternatively, two head suspensions 30 can be mounted on arm region 14, one on each side of the arm region, consistent with the manner for attaching head suspensions to the actuator described in greater detail below.

Each of the head suspensions 30 includes a mounting region 32 at an end of suspension 30, a spring region 34, and a rigid region 36. A head slider 8 (shown only in FIG. 1) is attached to the end of each head suspension 30 opposite the end at which mounting region 32 is located, and in this manner is supported over the surface of the magnetic disk 6. Suspension 30 can include a base plate (not shown) in mounting region 32 to facilitate attachment of suspension 30 to arm region 14. It is to be understood that configurations of head suspensions other than those shown in FIGS. 1–6 having a mounting region in accordance with the principles of the present invention can also be used. As described above, each head suspension 30 is mounted to one of the plurality of arm regions 14 extending from actuator 12, and while only a single head suspension 30/arm region 14 interface is shown in FIGS. 2 and 3 and described below, each of the head suspensions 30 of actuator assembly 10 can be mounted to an arm region 14 in a similar fashion.

Head suspension 30 is attached to arm region 14 of actuator 12 with a spring mount that engages an engagement structure when the spring mount is urged into a stressed condition. The spring mount can be positioned in one of either the arm region 14 of actuator 12 or the mounting region 32 of head suspension 30, and the engagement structure is positioned on a top surface of the other of the two regions. In the embodiment shown in FIGS. 1–3, the spring mount 15 is in the arm region 14 of actuator 12, and the spring mount 15 comprises first spring arm 16, second spring arm 18, and a longitudinal slot 20 formed between the first and second spring arms 16 and 18. First and second spring arms 16 and 18 can be elastically deformed, i.e. compressed or expanded, in a transverse direction from a neutral state to a stressed state for providing transverse forces to an engagement structure 40 in mounting region 32 of head suspension 30. Toward this end, in the embodiment of FIGS. 1–3, spring arms 16 and 18 have a plurality of mounting holes 26 formed at a free end 24 of the spring arms 16 and 18 and at a base portion 25 opposite the free end 24 of the spring arms. Mounting holes 26 can be formed using conventional techniques, such as during the extrusion of actuator 12 or by through etching the arm region of actuator 12.

Mounting holes 26 are adapted to engage engagement structure 40 in mounting region 32 of head suspension 30. In this embodiment, engagement structure 40 comprises a plurality of pins 38 extending from a top planar surface of the mounting region 32 of suspension 30. Alternatively, engagement structure 40 can extend from the opposite planar surface of the suspension 30 (i.e., the bottom surface). Pins 38 are substantially circular in cross-section to match the shape of mounting holes 26. Various configurations and shapes of pins 38 and mounting holes 26 can be used to alter the engagement between the pins 38 and mounting holes 26. For example, triangular shaped mounting holes and pins having a triangular cross-section can be used to provide additional mechanical engagement between the pins and the holes. Pins 38 are sized and positioned on the top surface of mounting region 32 of head suspension 30 in such a manner as to be aligned with mounting holes 26 in spring arms 16 and 18 when the spring arms 16 and 18 are elastically deformed from the neutral state. Pins 38 can be formed in mounting region 32 of head suspension 30 by partial etching mounting region 32 as is conventionally known. Alternatively, pins 38 can be separately formed and fixedly attached to mounting region 32 using conventional techniques, such as using adhesive or spot welding.

Pins 38 in mounting region 32 of head suspension 30 are engaged by the mounting holes 26 of spring arms 16 and 18 of arm region 14 for securing head suspension 30 to arm region 14. Specifically, spring arms 16 and 18 are elastically deformed from the neutral state to the stressed state, either through transverse compression or expansion of the spring arms, and once in the stressed state, mounting holes 26 are aligned with pins 38. Pins 38 are inserted into mounting holes 26, and spring arms 16 and 18 are then released and attempt to return to the neutral state. In this manner, the perimeter edges of mounting holes 26 engage the pins 38, which prevent arms 16 and 18 from returning to the neutral state, and a transverse force is thus exerted on pins 38 by spring arms 16 and 18. Head suspension 30 is thus securely held in place on actuator 12. Pins 38 can be coated with a material, such as adhesive, or otherwise be roughened to create a better engagement between pins 38 and mounting holes 26.

In the embodiment shown in FIGS. 1–3, a transverse slot 22 is additionally formed in each of the first and second spring arms 16 and 18 between free end 24 and base portion 25 of each spring arm to aid in attaching head suspension 30 to arm region 14. Specifically, transverse slots 22 can be used in conjunction with an external pivot pin 28 (shown only in FIG. 3) to provide a point about which the free end 24 of spring arms 16 and 18 can be elastically deformed independent of the base portion 25 of spring arms 16 and 18. Spring arms 16 and 18 can be elastically deformed from the neutral state into the stressed state as described above, and mounting holes 26 at the base portion 25 of spring arms 16 and 18 can be aligned with the corresponding pins 38 in mounting region 32 of suspension 30. Due to manufacturing tolerances or design considerations, however, the mounting holes 26 at the free end 24 of spring arms 16 and 18 may not line up with the corresponding pins 38 at this point. A pivot pin 28 is inserted in the longitudinal slot 20 adjacent the transverse slots 22. The free end 24 of spring arms 16 and 18 can then be further elastically deformed about pivot pin 28 independent of base portion 25 to align mounting holes 26 in the free end 24 of spring arms 16 and 18 with corresponding pins 38 in mounting region 32 of suspension 30. Once all of the pins 38 are inserted in mounting holes 26, spring arms 16 and 18 are released, and the pivot pin 28 in longitudinal slot 20 is removed, thus securing head suspension 30 to arm region 14.

Figure 4:
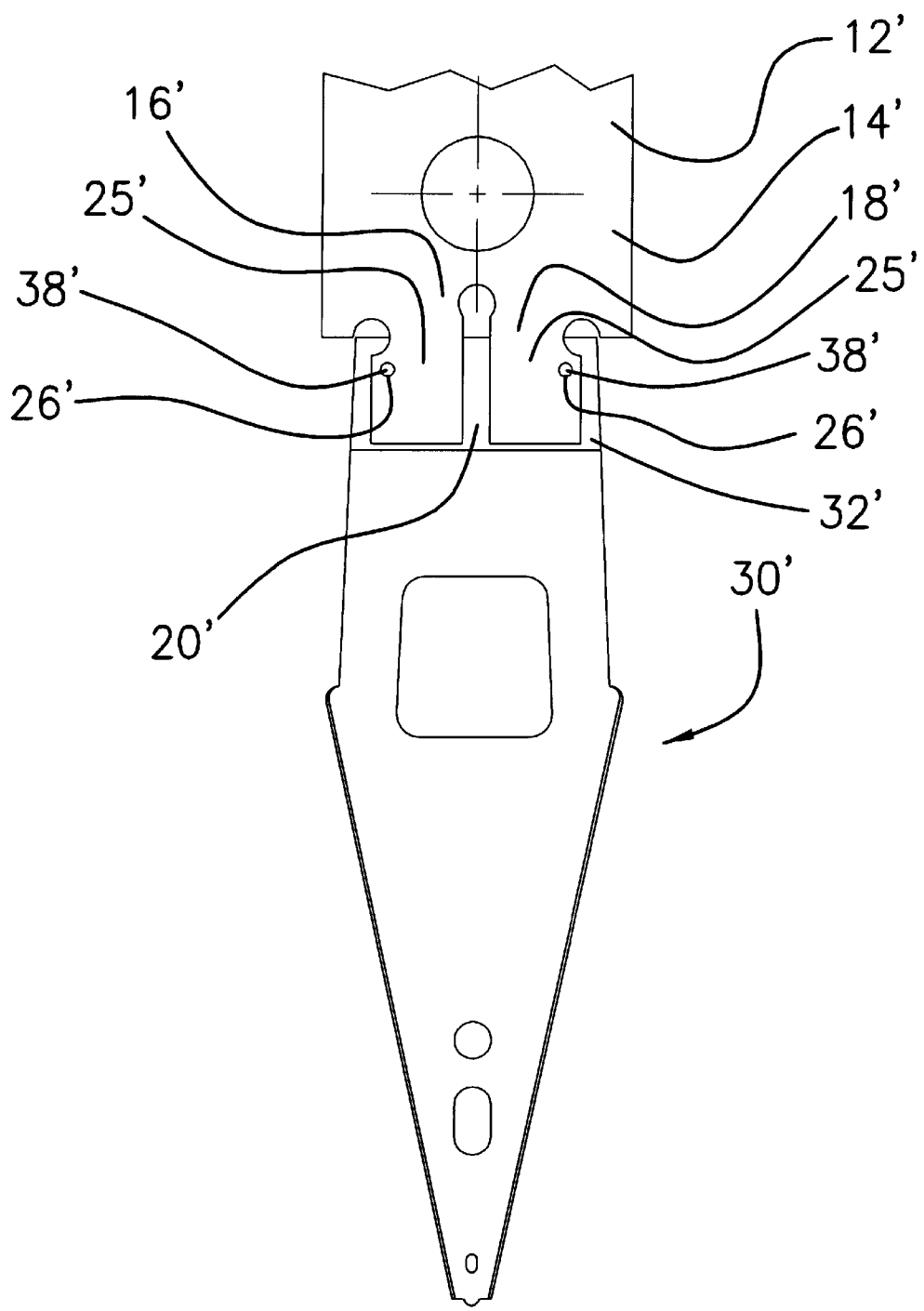
FIG. 4 is a top plan view of a second embodiment of a portion of an actuator assembly in accordance with the present invention.
Figure 5:
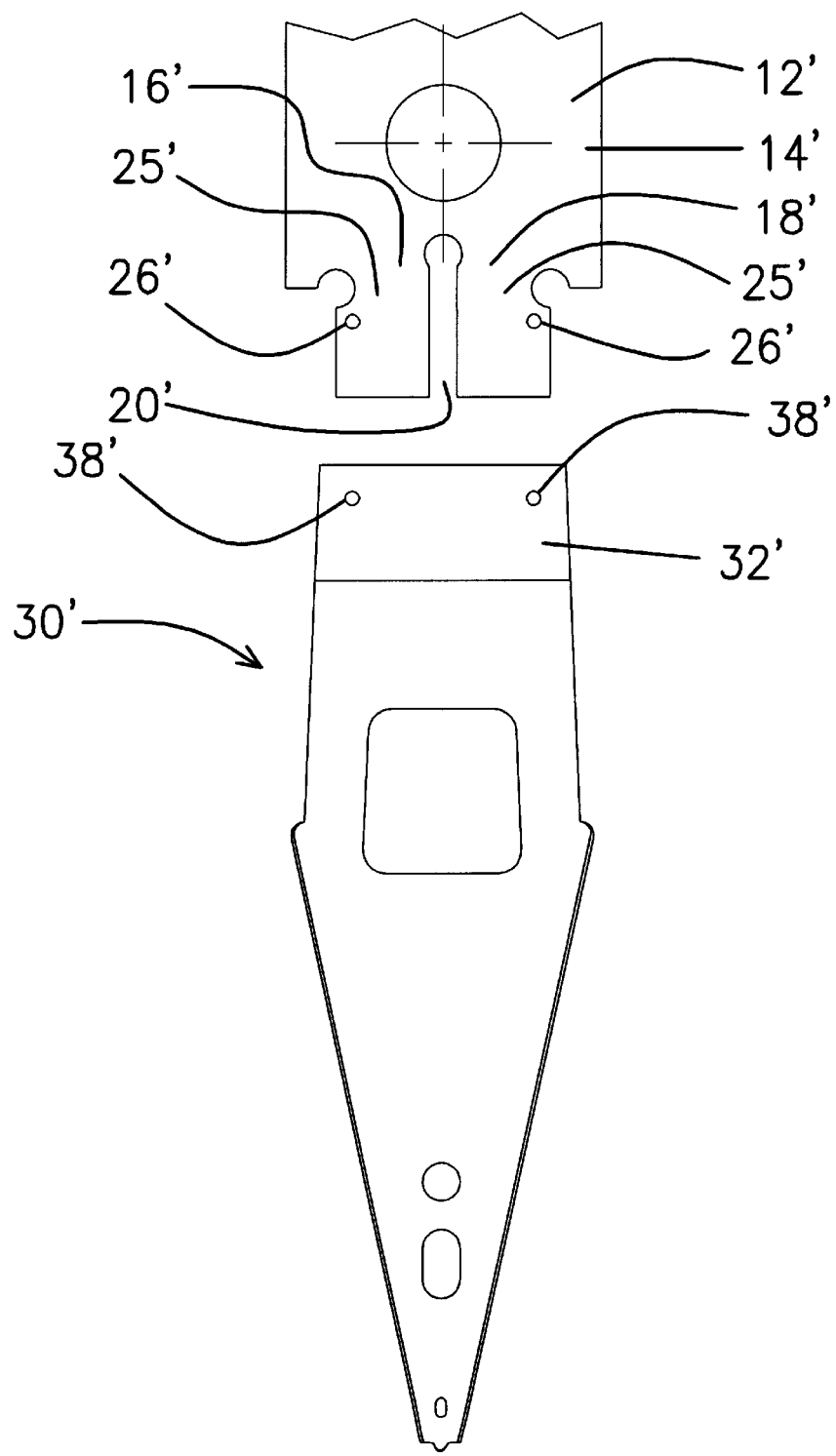
FIG. 5 is an exploded top plan view of the actuator assembly shown in FIG. 4.

FIGS. 4 and 5 are partial plan views of a second embodiment of an actuator assembly in accordance with the present invention. Specifically, FIGS. 4 and 5 show an actuator 12' having an arm region 14' with first and second spring arms 16' and 18' having a longitudinal slot 20', but having only two mounting holes 26' formed in the base portion 25' of spring arms 16' and 18'. Mounting region 32' of head suspension 30' includes two pins 38' sized and positioned to be engaged by the perimeter edges of mounting holes 26' when spring arms 16' and 18' are elastically deformed from the neutral state to the stressed state. Those skilled in the art will recognize that a wide variety of mounting holes and pins, including a variety of shapes and sizes of the mounting holes and corresponding pins, can be used without departing from the spirit and scope of the present invention. In addition, pins 38' can be treated, such as with adhesive, or otherwise roughened to create a better engagement between pins 38' and mounting holes 26'.

Figure 6:
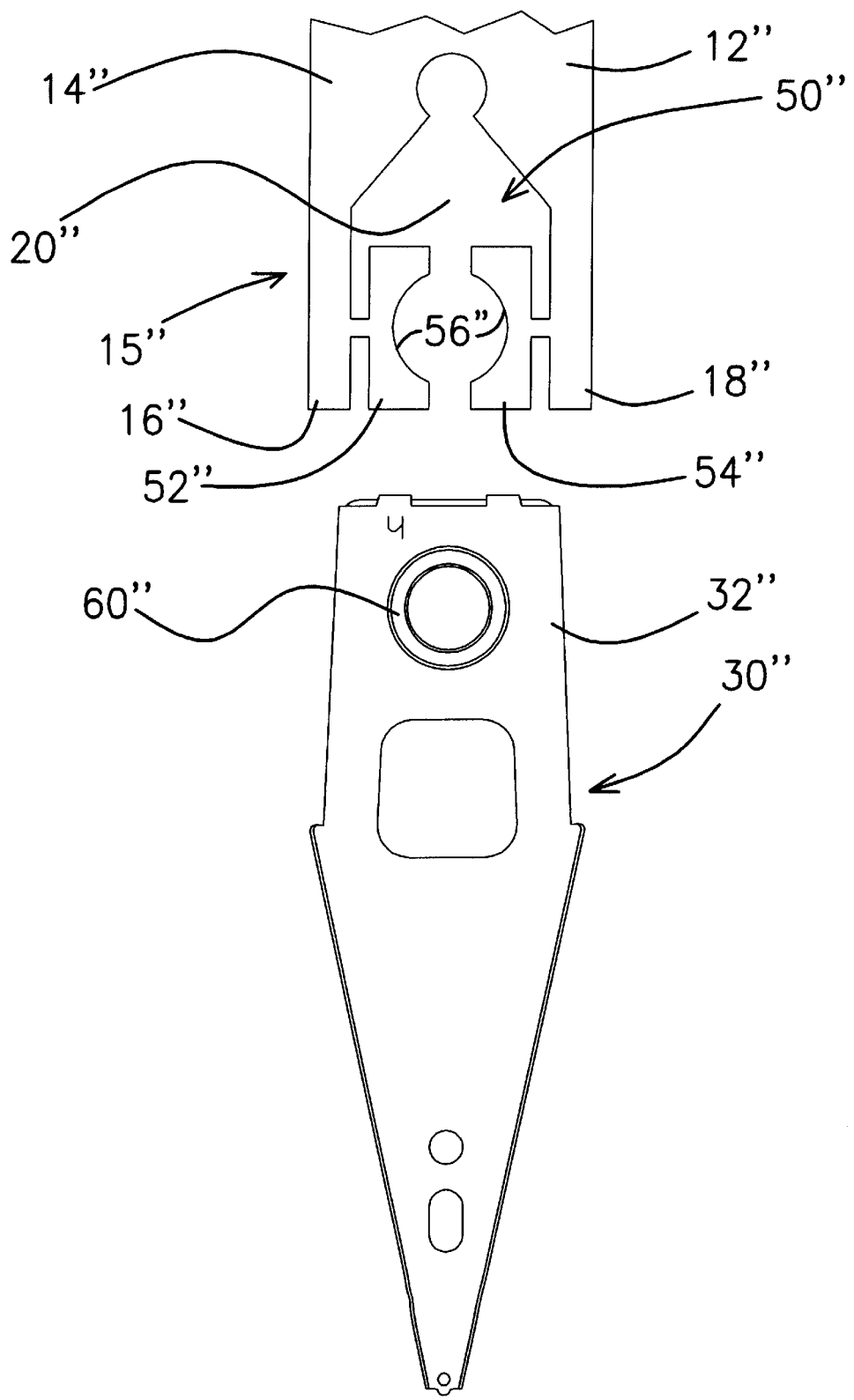
FIG. 6 is an exploded top plan view of a portion of a third embodiment of an actuator assembly in accordance with the present invention.

FIG. 6 shows a third embodiment of an actuator assembly in accordance with the present invention. In this embodiment, the spring mount 15" for attaching the head suspension 30" to the actuator 12" includes spring arms 16" and 18" in combination with a boss mount 50". The boss mount 50" comprises a pair of members 52" and 54" that extend in a transverse direction from spring arms 16" and 18" into longitudinal slot 20" of arm region 14". Members 52" and 54" each have a concave surface 56". Mounting region 32" of head suspension 30" includes a boss 60" that extends from a top surface of mounting region 32". Boss 60" is engaged by concave surface 56" of members 52" and 54" of the boss mount 50" to secure head suspension 30" to actuator 12". Specifically, spring arms 16" and 18" of arm region 14", and thus boss mount 50", is expanded from the neutral state to the stressed state, and boss 60" is placed between members 52" and 54". Spring arms 16" and 18" are then released, and members 52" and 54" are urged toward boss 60", with concave surface 56" of the members engaging the boss 60". Spring arms 16" and 18" are held in the stressed state by the boss 60", thereby providing an engagement force that secures head suspension 30" to actuator 12". The exterior surface of boss 60" that is engaged by the concave surface 56" of members 52" and 54" can be coated with a material, such as adhesive, or otherwise be roughened to create a better engagement between the boss 60" and the concave surface 56" of boss mount 50". Other shapes and configurations of the boss mount 50" and the boss 60" can of course be used without departing from the spirit and scope of the present invention. For example, a boss that is engaged by surfaces of a boss mount after the spring arms are compressed rather than expanded can be used to provide an equivalent engagement force for securing a head suspension to an actuator.

An actuator assembly in accordance with the present invention possesses many advantages. For example, no swaging process is used to attach the head suspensions to the actuator in the actuator assembly, thereby reducing the potential for warping or deformation of the actuator assembly, which would negatively affect the functioning of the head suspension during operation of the disk drive. In addition, the use of a spring mount for attaching a head suspension to an arm region of the actuator allows individual head suspensions in the actuator assembly to be reworked or replaced as necessary. The attachment between the planar surface of the head suspension and the arm region of the actuator also provides a simplified attachment system that makes for a more efficient manufacturing and assembly process. This interface also allows the individual head suspensions to be free of a vertical swage boss extending from the mounting region, which in turn reduces the spacing between individual suspensions, and reduces the overall profile of the actuator assembly. In view of the overall industry trend toward smaller disk drives, this is a particularly advantageous feature.

Although the present invention has been described with reference to preferred embodiments, those skilled in the art will recognize that changes may be made in form and detail without departing from the spirit and scope of the invention.

What is claimed is:

1. An actuator assembly for supporting a read/write device in an information storage device, comprising:

an actuator including an arm region extending from the actuator;

a suspension having a mounting region at an end of the suspension;

a spring mount on one of the arm region of the actuator and the mounting region of the suspension, the spring mount being elastically deformable from a neutral state to a stressed state;

an engagement structure on the other of the arm region and the mounting region, the engagement structure being coupled to the spring mount when the spring mount is in the stressed state for securing the suspension to the actuator;

a plurality of pins on one of the spring mount and the engagement structure; and a plurality of holes formed in the other of the spring mount and the engagement structure, each hole having a first perimeter edge and an opposite second perimeter edge, the plurality of pins being engaged with the first perimeter edge of each of the plurality of holes while the spring mount is in the stressed state to provide a coupling force between the spring mount and the engagement structure at the first perimeter edge while being free from the coupling force at the second perimeter edge so that the suspension is removably secured to the actuator.

2. The actuator assembly of claim 1, wherein the arm region of the actuator includes the spring mount and the mounting region of the suspension includes the engagement structure.

3. The actuator assembly of claim 2 including a plurality of arm regions, each arm region having a spring mount, and a plurality of suspensions, each suspension having an engagement structure engaged by the spring mount of a respective one of the plurality of arm regions for securing the suspensions to the actuator.

4. The actuator assembly of claim 2 wherein the spring mount includes first and second spring arms each having a free end and a base portion, and a longitudinal slot between the first and second spring arms.

5. The actuator assembly of claim 4, wherein:

the engagement structure includes the plurality of pins, the plurality of pins extending from the mounting region of the suspension; and the spring mount includes the plurality of holes, the plurality of holes formed in the first and second spring arms of the spring mount.

6. The actuator assembly of claim 5, wherein at least one of the plurality of holes of the spring mount is formed in the base portion of each of the first and second spring arms.

7. The actuator assembly of claim 6, wherein:

the plurality of pins of the engagement structure comprises two pins extending from the mounting region of the suspension, each of the two pins being aligned and engaged with a respective one of the plurality of holes formed in the base portion of each of the first and second spring arms when the spring mount is in the stressed state to provide the coupling between the spring mount and the engagement structure.

8. The actuator assembly of claim 6, wherein at least one hole of the plurality of holes of the spring mount is formed in the free end of each of the first and second spring arms.

9. The actuator assembly of claim 7, wherein each of the first and second spring arms has a transverse slot formed in the first and second spring arms between the base portion and the free end of each of the first and second spring arms.

10. The actuator assembly of claim 8, wherein:

the plurality of pins of the engagement structure comprise four pins extending from the mounting region of the suspension, each of the four pins being aligned and engaged with a respective one of the plurality of holes formed in the base portion and the free end of each of the first and second spring arms when the spring mount is in the stressed state to provide the coupling between the spring mount and the engagement structure.

\* \* \* \* \*